May 24, 1966  H. JAUCH  3,253,207

MEASURING APPARATUS

Original Filed May 31, 1957  5 Sheets-Sheet 1

INVENTOR
Herman Jauch
BY
Michael S. Striker
Attorney

May 24, 1966  H. JAUCH  3,253,207
MEASURING APPARATUS
Original Filed May 31, 1957  5 Sheets-Sheet 2

INVENTOR
Herman Jauch
BY
Michael S. Striker
Attorney

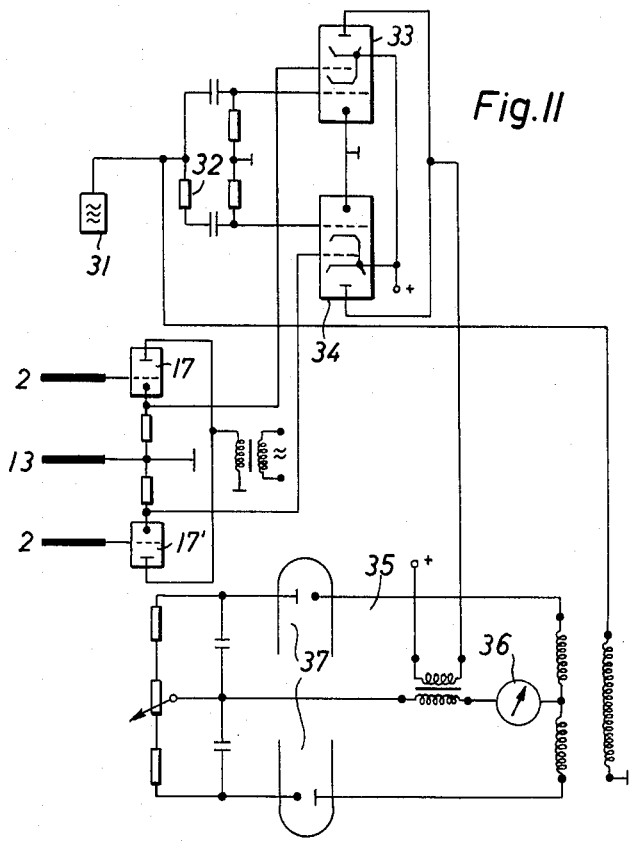
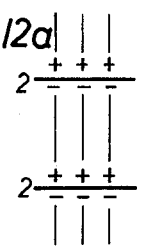
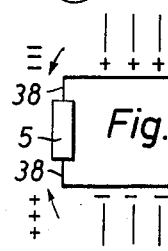
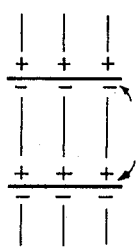
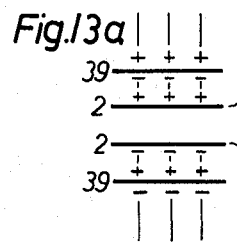
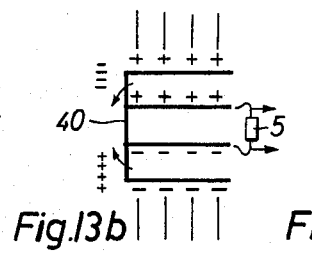
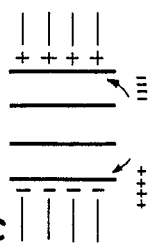

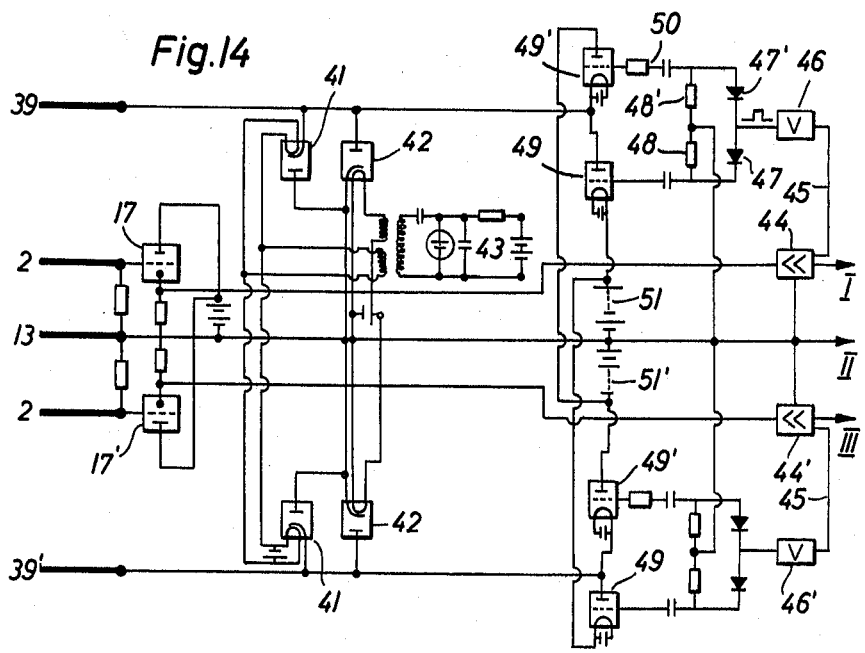
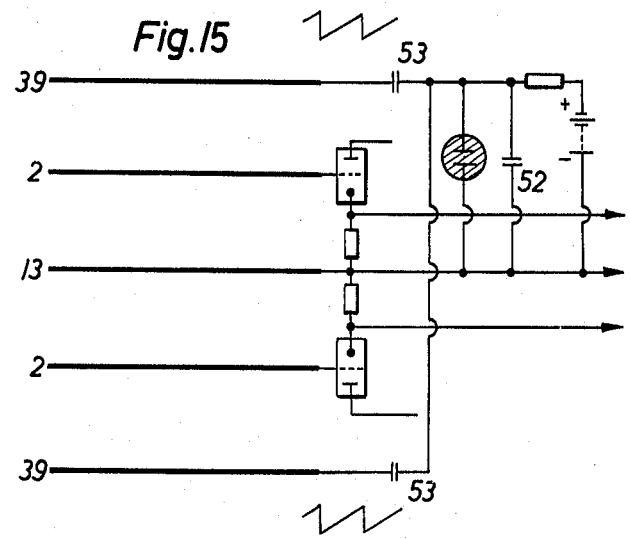

3,253,207
MEASURING APPARATUS
Hermann Jauch, Kornerstrasse 58, Rottweil, Wurttemberg, Germany
Original application May 31, 1957, Ser. No. 662,879, now Patent No. 2,993,165, dated July 18, 1961. Divided and this application Apr. 20, 1961, Ser. No. 104,438
10 Claims. (Cl. 320—1)

The present invention relates to an apparatus for electrostatically measuring electric field intensity, particularly for measuring the intensity of an atmospheric electrostatic field.

This application is a division of my copending patent application Serial No. 662,879, now Patent No. 2,993,165, filed May 31, 1957, entitled "Measuring Apparatus."

Known apparatus of this type incorporate two electrically conductive collector electrodes which are well insulated from each other and which are connected to each other by way of a precision resistance for measurement purposes. One disadvantage of the known apparatus is that one side must be grounded so that the apparatus cannot be freely moved in space. Moreover, existing apparatus are usually constructed non-symmetrically and for this reason have a relatively low sensitivity. In one known type of cylindrical measuring apparatus the measuring voltage must be taken off slip rings, and this easily produces interference and inaccuracies.

A precise determination of the actual field pattern of the atmospheric electrostatic field pattern as a function of space and time is possible only when free movement of the apparatus is not limited due to the fact that it must be grounded or that it must be attached to a suitable power supply. The present invention recognizes the fact that the greater the ratio $Q/C$ the greater the sensitivity of the apparatus, with Q representing the charge on the collector electrodes which is caused by the electrostatic field and with C representing the capacity between the collector electrodes.

It is therefore an object of the present invention to provide an extremely sensitive electrostatic field measuring apparatus which need not be grounded and movement of which is not limited by the necessity of attaching the apparatus to a suitable power supply. With this object in view, the present invention resides in a measuring apparatus in which the collector electrodes are in the form of stationary and substantially parallel plates, which plates are periodically shielded by means of two electrically connecting shielding electrodes which have the same or similar shape as the collector electrodes. One advantage of the present invention is that such an apparatus need not be grounded but nevertheless is capable of eliminating the influence of interfering fields which are in the vicinity of the area where the measurement is being carried out. Additionally, a measuring apparatus according to the present invention is considerably more sensitive than existing apparatus.

In various embodiments according to the present invention the measuring electrodes are periodically shielded by rotating shielding electrodes. In other embodiments the shielding electrodes, which are above and below the measuring electrodes, are stationary and these shielding electrodes are periodically connected to each other and insulated from each other so that the charges formed thereon are neutralized, so that the same end result is obtained as in the case of rotating electrodes.

The two measuring electrodes are connected to the input of an amplifier, a suitable measuring resistor being connected across the measuring electrodes. If desired, the variation in the charge on the collector electrode and consequently a measurable voltage dependent upon the strength of the extraneous field can be obtained, instead of periodically shielding and unshielding the collector electrodes or instead of periodically connecting and disconnecting the shielding electrodes to and from each other, by providing a rotatable dielectric plate having the same or similar shape as the collector electrodes which dielectric plate is arranged between the collector electrodes and rotatable relative thereto.

According to another embodiment of the present invention the varying charge on the collector electrodes and consequently the measurable voltage is produced by varying the distance between the collector electrodes.

According to one preferred embodiment of the present invention the two measuring electrodes are preferably triangular and are arranged exteriorly of the axis of the two rotating shielding electrodes, the latter being so shaped that in one position the measuring electrodes are completely covered and in another position completely uncovered. For example, the shielding electrodes may be in the form of a regular polygon. The shielding electrodes are arranged in a suitable housing which is open on one side but which does not cover the measuring electrodes. This embodiment has the particular advantage that when the shielding electrodes do not cover the measuring electrodes these shielding electrodes have practically no disturbing influence upon the field within which the measuring electrodes are located so that the sensitivity of such an arangement is substantially higher than that of existing apparatus. Also, the sensitivity of such an embodiment is increased by virtue of the fact that the measuring electrodes are spaced from the housing so that the capacitance between the collector electrodes is kept particularly small. Additionally, in such arrangement the unavoidable capacitance between the lead connecting the collector electrodes to the input of the amplifier is maintained very small.

According to another embodiment for the present invention the electric mid-point of the resistor connecting the two measuring electrodes is connected to a screening electrode and the latter, if one is provided, is connected to the carrier of the apparatus if such carrier is one capable of holding an electrostatic charge which may result in rendering the measurement obtained by the apparatus inaccurate. Such a carrier may be in the form of a balloon, an aircraft, or the like. This has the advantage that the charge on the carrier has no influence upon the measurement obtained by the apparatus inasmuch as the field produced by this charge is distributed symmetrically upon the measuring apparatus. Consequently, the apparatus can be used in the vicinity of stationary or movable components which are capable of retaining electrostatic charges which would otherwise adversely influence a measurement. Thus, according to one embodiment of the present invention an additional metallic electrode is arranged between the two measuring electrodes, which additional electrode is connected to the housing as well as to the shielding electrodes. If the voltage produced by the charges upon the measuring electrodes and the middle electrode across the two portions of the resistor are separately amplified and are so connected to the measuring bridge that they are additive, then a disturbing influence upon the field to be measured is exerted by the potential upon the middle electrode only when this potential very materially differs from the potential of the vicinity.

Heretofore an indication of the direction of the field was possible only when an auxiliary generator was provided, the impulse of which was greatly amplified and was fed together with the measuring impulses to a phase responsive detector. However, according to the above described embodiment of the present invention, the direction of the field can be determined without additional components by the voltages which appear upon the measuring resistance. If a separate rectifier and amplifier is connected to the individual portions of the resistance, then only one or the other will operate depending upon the direction of the field. In this manner it is possible to determine not only the magnitude of the field of strength but also the direction thereof.

In another preferred embodiment of the present invention the measuring resistance is replaced by a grid-cathode path or by two serially connected high ohmic grid-cathode paths. In the latter arrangement a middle electrode arranged between the two measuring electrodes is connected to the middle of the two serially connected grid-cathode paths, the latter preferably being in the form of electrometer tubes. As already set forth above, this middle electrode can be electrically connected to the shielding electrodes.

According to another embodiment of the present invention, the capacitance of the leads connecting the measuring electrodes to the input on the amplifier as well as the input capacitance of the amplifier itself can be compensated for by connecting the measuring electrodes to at least one choke coil and by so selecting the parameters of the thus formed parallel resonant circuit that its resonant frequency is equal to the indicated frequency at which the measuring electrodes are shielded and uncovered by the shielding electrodes or the frequency at which the stationary shielding electrodes are charged and discharged. This embodiment can be so constructed that the choke coil is parallel to the measuring electrodes. The choke coil can be tapped in the middle so that one of the above described arrangements is formed. The sensitivity increases with increased resonance frequency and when the latter is substantially the same as the indicated frequency the sensitivity is increased by a factor of approximately 100. Additionally, the sensitivity is increased inasmuch as the inevitable capacitance of the various circuits components is no longer harmful inasmuch as this capacitance simply forms part of the total capacitance of the resonant circuit.

In those embodiments in which the shielding electrodes are stationary relative to the measuring electrodes and in which the shielding electrodes are periodically discharged and insulated from each other, the insulation of the shielding electrodes is so selected that during that portion of the cycle during which the shielding electrodes are insulated from each other the time constant of a charge equalization by way of the insulation under the influence of the electric field is large as compared to the time constant of a charge equalization which, upon creation and destruction of an electrostatic field between the shielding electrodes, takes place from one measuring electrode to the other by way of the resistance.

In the above described embodiments a change in the extraneous field between the two measuring electrodes is produced by readily controllable constant means, this field between the measuring electrodes being proportional to the strength of the ambient extraneous field. For example, this is accomplished by periodically varying the distance between the electrodes or by periodically introducing a dielectric between the measuring electrodes. Alternatively, by shielding the measuring electrodes from the extraneous field the field which influences these measuring electrodes can be reduced to zero, so that in this way a field change can be produced which is proportional to the intensity of the extraneous field, so that a voltage dependent upon the changes is produced across the measuring electrodes. For such measurements in which the relative changes in the field intensity are of greater importance than the absolute value of the extraneous field, it is possible to use embodiments of the present invention in which the absolute value of the extraneous field is determined but once at the beginning of the measuring operation. Afterwards, the individual measurements will simply measure the variations which the extraneous field has undergone. This simplified measuring procedure has the advantage that the periodically moved shielding electrodes may be dispensed with. However, for such measurements it is essential that the time constant of the measuring resistance between the measuring electrodes be large relative to the time interval during which the entire measuring sequence is carried out. Alternatively, the voltage/time curve of the charge equalization of the measuring electrodes over the resistance should be known so that the actual values can be computed from the measurements obtained. In these last mentioned embodiments the extraneous field acts constantly upon the measuring electrodes and only the relatively small voltages which bring about a change of the extraneous field acting upon the measuring electrodes are amplified and indicated, and thereafter added to or subtracted from the field intensity measured at the beginning of the measurement operation. It has been found that measurements obtained in this manner are adequate for practical purposes.

In view of the fact that the intensity of the field and consequently the measurable voltages are relatively small when the apparatus is moved from place to place within any particular region, suitable means are provided by means of which these relatively small voltages produced by the changes in the extraneous field may more readily be determined. This may be achieved by periodically reversing the polarity of the leads connecting the measuring electrodes and the resistance. Alternatively, the input tube is modulated with audio-frequency. According to a third embodiment of this group field plates are substituted for the shielding electrodes and are arranged on opposite sides of the measuring electrodes, and these field plates are preferably modulated with sawtooth impulses. This achieves substantially the same result as modulating the input tube, but it produces the advantage that the extraneous field may be modulated oppositely, i.e., with a phase shift of 180°. This simplifies the construction of the amplifier and the measuring bridge, and additionally, this enables the direction of the field to be measured.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 11 is a schematic diagram of an embodiment of the present invention capable of giving a phase responsive indication;

FIGS. 12a, 12b, and 12c schematically illustrate the operation of embodiments;

FIGS. 13a, 13b and 13c illustrate the operation of an embodiment according to the present invention with stationary shielding electrodes or field electrodes;

FIG. 14 is a schematic diagram of a circuit adapted to be used in conjunction with the embodiment shown in FIGURE 13; and FIG. 15 shows an additional embodiment of a circuit adapted to be used in a measuring apparatus according to the present invention.

Figure 1:
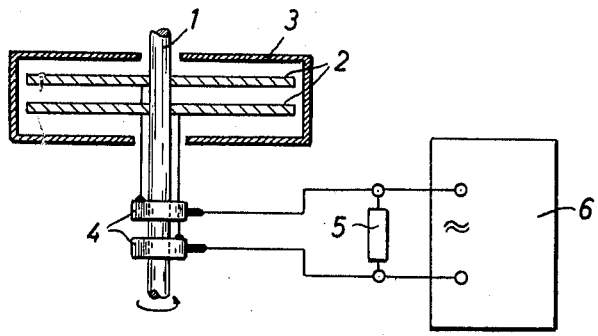
FIGS. 1, 1a–5 are schematic representations of several embodiments according to the present invention.
Figure 1A:
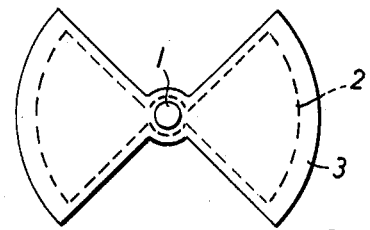

FIGS. 1 and 1a show an embodiment which is symmetrically constructed. The apparatus comprises a shaft 1 which is suitably mounted for rotation and which carries two symmetrical parallel measuring electrodes 2. The shaft 1 is made of good insulating material. The measuring electrodes 2 are encompassed by the shielding electrodes 3 which are likewise symmetrical relative to each other. The measuring electrodes and shielding electrodes are shaped as shown in FIGURE 1a so that in one position the measuring electrodes are completely covered by the shielding electrodes whereas when the shielding electrodes are rotated 90° they free the measuring electrodes so that the latter are completely uncovered. The individual plates of the electrodes are connected to the ends of a resistor 5 by way of slip rings 4, the resistor 5 being connected in parallel to the input of an amplifier 6.

When the measuring electrodes are exposed to a field, the same will induce a charge upon the electrodes. However, there will be no voltage between the plates of the electrodes inasmuch as the electrostatic field between the plates is collapsed by way of the resistor 5. When two measuring electrodes not connected via the resistor 5, they are dissimilarly charged. However, when the measuring electrodes are shielded, the charges induced upon the plates previously by the extraneous field will equalize themselves so that a current will flow through the measuring resistance 5. Thus, a voltage may be measured across the resistance, and this voltage is a measure of the extraneous field, this field, however, no longer acting upon the measuring electrodes due to the shielding. The shielding electrodes may be so shaped that a sinusoidal voltage is provided across the resistance 5. If the shielding were provided on but one side, the apparatus would have to be grounded.

Figure 2:
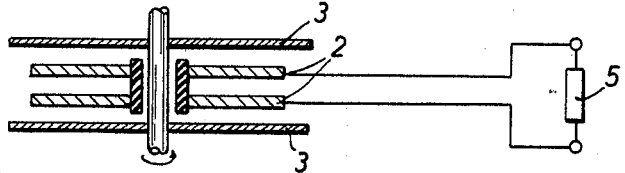

The embodiment shown in FIG. 2 differs from that illustrated in FIG. 1 only in that the shielding electrodes 3 are movable and the measuring electrodes 2 are stationary so that it is not necessary to provide any slip rings which form a source of considerable errors in measurement.

Figure 3:
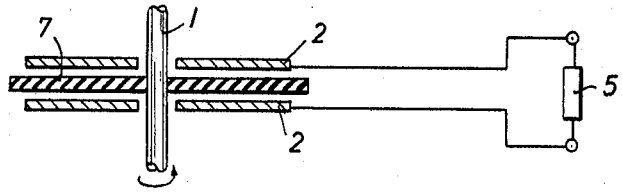

In the embodiment shown in FIGURE 3 the measuring electrodes 2 are shielded from each other only from time to time in order to establish a reference point for the measurement or for regulating the same. To this end a dielectric plate 7 is arranged between the measuring electrodes 2, the plate and the electrodes having the same shape substantially as shown in FIG. 1a. The plate 7 is carried upon the shaft 1 so that the plate may be moved between two positions in one of which it is outside of the space between the electrodes. With the extraneous field remaining constant, the electrostatic charge upon the measuring electrodes 2 is greater when the dielectric plate 7 is between the measuring electrodes 2 than when the plate 7 is exteriorly of the space between the measuring electrodes 2. Consequently, a capacitance current will flow through the resistance 5, the period of this current being equal to twice the speed of rotation of the plate 7 and the amplitude of the current being a measure of the intensity of the extraneous field.

Figure 4:
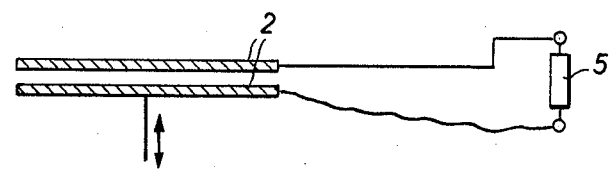

FIGURE 4 shows an arrangement in which a variation in the distance between the measuring electrodes produces a capacitance current through the resistance 5. As in the above embodiments, the amplitude of the current is a measure of the intensity of the extraneous field to be measured.

In the embodiment shown in FIGS. 3 and 4 the resistance 5 must be very high so that the time constant of the flow of charges through the resistance 5 is very large, which flow would eventually bring about a collapse of the field between the two measuring electrodes.

In the embodiments shown in FIGS. 1 and 2 the extraneous field acting upon the measuring electrode 2 comes and goes periodically at that frequency at which the measuring electrodes are screened. In the embodiment shown in FIGS. 3 and 4 the field prevailing between the measuring electrodes is changed periodically either by introducing a dielectric between the measuring electrodes or by varying the distance between them. In each of the embodiments shown in FIGS. 1 and 4 a change is obtained which is proportional to the absolute value of the extraneous field.

Figure 5:
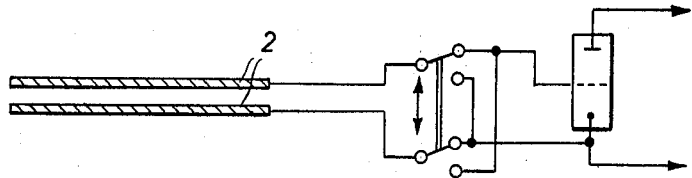

In contradistinction thereto, the field acting on the measuring electrodes 2 in the embodiment of FIGURE 5 is not changed. Instead, the polarity of the connecting leads between the measuring electrodes 2 and the resistance which is shown as being in the form of the grid cathode path of an electrometer tube, is periodically reversed. The charges on the electrodes 2 constantly seek to equalize themselves by way of the very large resistance constituted by the grid-cathode path of the electrometer tube, and a very small current is permitted to flow so that a voltage can actually be measured between the grid and the cathode. The time constant for this discharge process should be as high as possible, such as of the order of one or more hours. The changes of intensity of the extraneous field as a function of the location of the apparatus may thus be determined by measuring the changes in the voltage between the measuring electrodes 2. In the event the measuring process requires a length of time which is comparable to the time constant of the discharge process, the voltages obtained must be computed into different voltages by means of a voltage/time curve. The periodic reversal of polarity of the leads between the measuring electrodes and the measuring resistance, which in the illustrated embodiment has been shown as a grid cathode path, produces an alternating voltage, so that an A.C. amplifier can be provided. An A.C. amplifier is far simpler to build and to operate than a D.C. amplifier, the latter being required for amplifying the relatively small voltage fluctuations which occur at the grid of electrometer tube due to variations in the intensity of the extraneous field depending upon the location of the apparatus. This variation in the extraneous field may also be obtained by the embodiment shown in FIGURE 5 by providing a rectifier, preferably a full-wave rectifier, connected behind the A.C. amplifier.

By virtue of an apparatus according to the present invention, and particularly due to the symmetrical arrangement of the measuring electrodes, it is not necessary to ground the apparatus, and its sensitivity is thus materially greater than that of existing apparatus. This increased sensitivity and the fact that the apparatus need not be grounded makes it possible for the apparatus to be used in many ways heretofore impossible. For example, the increased sensitivity enables the apparatus to be used for testing dielectric materials in such a manner that the material itself is not destroyed. Additionally, the precise field pattern of an atmospheric static field can be examined very accurately. A particularly significant use of the present invention is that a measuring apparatus of the type disclosed herein can be used for examining the make-up characteristic features of the upper layers of the earth's surface by measuring irregularities of the electrostatic field. Moreover, a measuring apparatus according to the present invention may be used for measuring the charge on living organisms and for measuring artificially induced charges for medicinal purposes.

Figure 6:
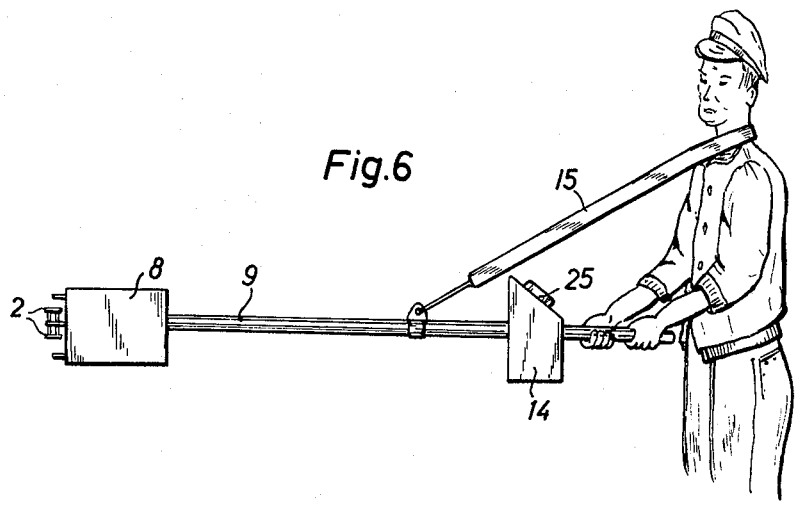
FIG. 6 shows the construction and use of an apparatus according to the present invention.
Figure 7:
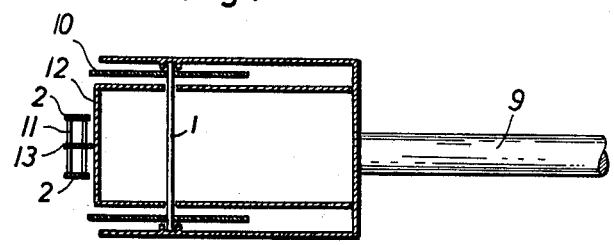
FIG. 7 is a sectional view through the measuring head of the apparatus shown in FIG. 6.
Figure 8:
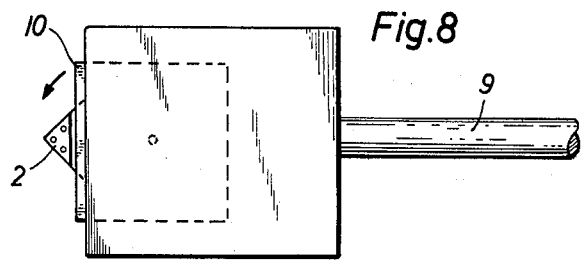
FIG. 8 is a plan view of the measuring head of the apparatus shown in FIG. 6.

FIGS. 6 to 8 show one embodiment of an apparatus according to the present invention which possesses the characteristic features of the embodiment shown schematically in FIGURE 2. A measuring head 8 arranged at the forward end of a rod 9 carries a driving motor (not shown) for the shaft 1 which carries the shielding electrodes 10, the latter being in the form of squares. Additionally, the measuring head 8 carries an amplifier. The measuring electrodes 2 are carried by insulating rods 11 which are attached to a middle electrode 13, the latter being connected to the housing 12. The housing 12 contains the resistance 5, or its equivalent, as well as an amplifier 6. The measuring electrodes 2 consist of triangular plates and are so arranged that when the shielding electrodes occupy the position shown in FIGURE 8 the measuring electrodes 2 are completely exposed to the extraneous electrostatic field. When the shaft 1 is rotated 45°, the measuring electrodes 2 are completely shielded by the shielding electrodes 10.

A housing 14 attached to the rear portion of the rod 9 contains the measuring bridge, and a carrying strap 15 which is attached to the rod 9 at approximately its middle serves to facilitate holding and carrying of the entire apparatus. The rod 9 is made of insulating material so that the measuring head 8 is free to assume the potential of its immediate vicinity rather than the potential of the operator who will be either at ground potential or at the potential of his immediate vicinity. Thus, thanks to the relatively large distance between the measuring head 8 and the operator the field to be measured by the measuring head 8 is, for all intents and purposes, uninfluenced by the operator.

Figure 9:
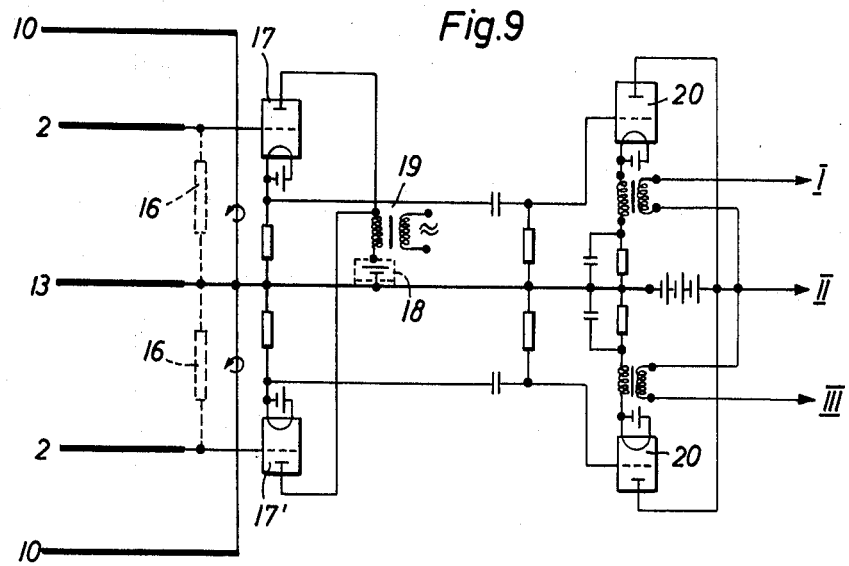
FIG. 9 is a schematic diagram of one embodiment of a circuit incorporated in the measuring head.

FIGURE 9 shows a suitable schematic diagram of the measuring head 8. The circuit includes two electrometer tubes 17 arranged in common plate connection, these tubes taking the place of a resistor 5 the middle of which could be connected to the middle electrode 13. The grids of these tubes are connected to each other and to the middle electrode by way of high ohmic resistances 16. The higher the speed of rotation of the shielding electrodes 10, the lower need be the resistance of the resistors 16. The electrometer tubes 17 are supplied by an anode battery 18 and the anode current is additionally modulated by a transformer 19 so that even when the screening electrodes 10 rotate relatively slowly, the amplifier may still operate in its linear zone. The input to the electrometer tubes is in phase so that in the bridge circuit which is connected behind the amplifier circuit the alternating current across the anodes of the electrometer tubes will have no effect. Instead only the fluctuations which will result due to the extraneous field will be indicated. In order to assure operation of the amplifier in the linear zone, the amplifier tubes 20 should also be connected in common base connection. As a result, the output resistance of the amplifier, to which the bridge circuit is connected, will be low. The alternating voltages are amplified separately and are subsequently rectified separately as well.

Figure 10:
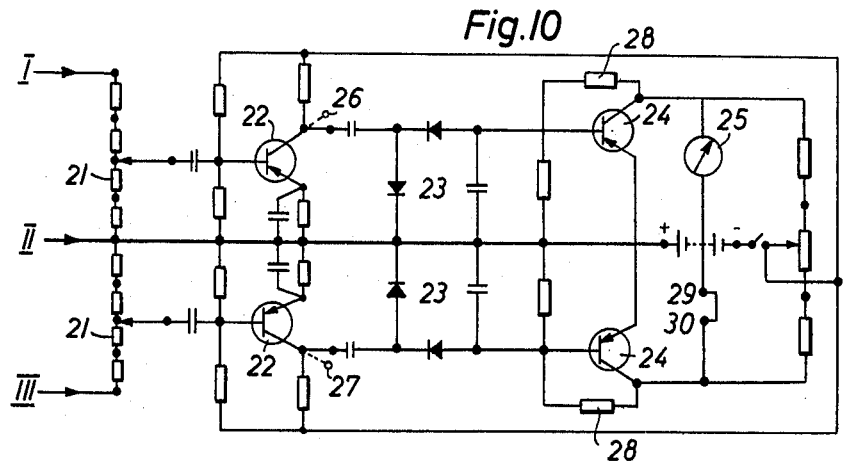
FIGS. 10, 10a, 10b are schematic diagrams of indicating bridges.

FIGURE 10 shows one embodiment of a circuit of the measuring bridge in housing 14. The measuring voltages of the two measuring electrodes are again separately amplified behind the input potentiometers 21 by means of transistors 22, and are then simultaneously rectified by a full wave rectifier indicated generally at 23. The thus obtained D.C. serves to control the transistors 24 of the measuring bridge. The measurement is thus particularly sensitive inasmuch as the upper half of the bridge is inversely detuned as the lower half so long as the field between the middle electrode 13 and two measuring electrodes 2 is in the same direction.

Figure 10A:
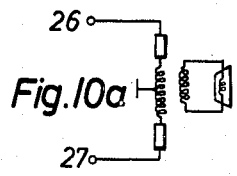
Figure 10B:
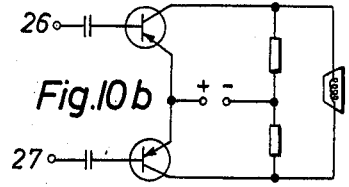

The measurement can be read from an indicating instrument 25, or an acoustic indication can be given. Such an acoustic indicator can be attached to binding posts 26 and 27 by way of a differential connection in which an indication of the alternating voltage of the modulation is suppressed. FIGURES 10a and 10b show such connections. The resistances 28 serve to balance the bridge. If desired, an additional indicating instrument can be connected to the binding posts 29 and 30.

FIGURE 11 shows a further embodiment of a circuit adapted to be connected to the measuring electrodes. The input circuit behind the electrodes is the same as in FIGURE 9. In the amplifier the high frequency generated by the generator 31 in the portion 32 is fed to the amplifier tubes 33 and 34 with a 90° phase shift. The voltages taken from the electrometer tubes of the measuring electrodes 2 are fed to the grids of the tubes 33 and 34 and thus amplify the high frequency of the generator 31. The grid potential of the electrometer tube 17 is higher than that of the electrometer tube 17', or vice versa, dependent upon direction of the field, and the magnitude of the phase shift relative to the generator frequency is changed by the cooperation of the two tubes 33 and 34. The phase of the frequency generated by the generator 31 is compared with the shifted frequency supplied to the measuring bridge, the magnitude of the phase shift being a measure of the field intensity and the direction of the shift being a measure of the direction of the field. The indicating instrument 36 thus shows not only the strength of the field being measured but also its direction. In this embodiment rectification in the bridge is carried out by means of a full wave rectifier tube 37.

FIGURES 12 and 13 schematically show additional circuits for measuring the field intensity of an extraneous field.

FIGURE 12 shows two measuring electrodes which are well insulated from each other and which are mounted on the measuring head in spaced relation relative to each other. FIG. 12a shows the initial state. The two measuring electrodes 2 are instantaneously connected to each other by way of a measuring resistance 5 so that the field between the electrodes 2, which field is dependent upon the extraneous field to be measured, collapses due to the discharge through the resistor 5. This displacement or capacitance current is then measured, either by any one of the above described arrangements or in any other suitable manner. The connection 38 (FIG. 12b) is then immediately opened and the two plates of the measuring electrodes will then again be charged to that extent to which they were charged before the charges were equalized by way of the conductor 38 (FIG. 12c) so that the electrodes 2 are once again electrically neutral relative to each other. This can be accomplished with the necessary degree of accuracy by means of electronic switches, it being essential that the connection of the plates, the equalizing of the charges, the opening of the connection 38 and the neutralizing of the electrically insulated plates 32 as a result of charging thereof be accomplished very rapidly one after the other and that the time interval which is necessary for this procedure be very small as compared to the time interval in which the steps follow each other, i.e., the time interval between the carrying out of individual measurements. To this end the resistance of the resistor 5 can be maintained relatively small so that the discharging process will not be encumbered by any large time constant. An amplifier is connected to the resistance 5 in the manner described above, and inasmuch as the voltage which appears across the resistance 5 and which is amplified by the amplier is a measure of the amplitude of the capacitance current, a part of the amplified impulse is used to neutralize the measuring electrodes 2 which are again insulated from each other. For very precise measurements it is essential that at the beginning of the above described cycle the plates 2 be electrically absolutely neutral relative to each other. This may most easily be accomplished by placing the plates 2, from time to time, in a cage and by electrically connecting the plates with the inside of this cage. In order to accomplish this, movable screening electrodes may be provided on opposite sides of the measuring electrodes 2, as set forth above, which electrodes may, whenever required, be turned so as to cover the plates 2. Additionally, the screening electrodes may be provided with a suitable connector brush or the like so that when the shielding electrodes cover the measuring electrodes, the outer surfaces of the latter are electrically connected to the inner surfaces of the screening electrodes.

Alternatively, two pairs of electrodes may be provided instead of but one pair. Such an arrangement, which is shown in FIGURE 13, has the advantage that the switching means for connecting the two measuring electrodes and the switching means for measuring the field can be maintained completely separate from each other. Thus, an apparatus according to FIGURE 13 incorporates in addition to the two measuring electrodes 2 two field electrodes 39 which are insulated from each other and are so arranged as to be capable of shielding or screening the measuring electrodes 2 completely. As set forth above, the measuring electrodes 2 are connected to a resistor 5 or to the grid-cathode paths of electrometer tubes, and the input of the amplifier is connected across the resistance. Assuming now that the field electrodes have been rendered electrically neutral relative to each other, such as by placing the electrodes in a cage, the extraneous field penetrates through the plates 39 and acts upon the measuring electrodes 2. Furthermore, it is assumed that in FIGURE 13 the extraneous field to be measured has changed between the instant shown in FIGURE 13a and the instant shown in FIGURE 13b. In the instance shown in FIGURE 13b, the outer field electrodes 39 are connected to each other by means of an electronic switch so that the field between the electrodes 39 collapses so that a capacitance current flows not only through the connector 40 into connecting the field electrodes 39 but also through the resistor 5 which interconnects the measuring electrodes 2. The voltage produced across the resistor 5 is amplified and the impulse taken from the output of the amplifier is a measure of the intensity of the extraneous field. This amplified impulse is used on the one hand for indicating purposes and on the other hand for bringing a charge on the now insulated field plates 39 which correspond in magnitude to the collapsed field, so that these plates are once again electrically neutral relative to each other. Discharging may be accomplished by way of electronic switching means.

FIGURE 14 is a schematic representation of a circuit adapted to be used in conjunction with the arrangement shown in FIGURE 13. The interconnection of the measuring electrodes 2, the middle electrode 13 and the electrometer tubes 17 and 17' is the same as in the above described embodiments, whereas the shielding electrodes 10 have been replaced by field electrodes 39. Each of the field electrodes is connected to the middle electrode 13 by way of two parallel tubes 41 and 42. The cathode of each tube 41 is connected to one of the field electrodes 39 and the plate of each tube 41 is connected to the middle electrode 13. The tubes 42 are inversely connected, the plates of each of the tubes 41 being connected to one of the field electrodes and cathode of each tube 41 being connected to the middle electrode. The cathodes of these tubes are heated by small heating batteries. The heating until emission, however, is the result of an impulse which is produced in the switching circuit 43, preferably by a thyratron, which impulse is inductively transmitted to the heating conductors of the individual tubes 41 and 42. The tubes 41 and 42 conduct in this heated state so that a voltage between the middle electrode 13 and the field electrodes 39 can equalize itself. When the field electrodes 39 carry a positive voltage, equalization takes place by the way of the tubes 42, whereas when the field electrodes 39 carry a negative potential, equalization takes place by way of tubes 41. The tubes 41 and 42 cease to conduct at the end of the heat impulses due to the cooling of the cathodes, so that the field electrodes are once again insulated from each other as well as from the other components. The field between the field electrodes 39 collapses during equalization which takes place as a result of the short circuit constituted by the parts 41, 42 and 43, and a voltage impulse is produced across the measuring electrodes 2, which impulse is amplified in the amplifiers 44, 44' and is supplied to the measuring bridge by way of the leads I, II, and III. However, a part of the impulse is fed to delay elements 46 and 46' by way of connectors 45 and 45', which elements 46 and 46' are so selected that the impulse leaves the elements only when the tubes 41 and 42 have been rendered non-conductive so that the field electrodes 39 are isolated from each other. The impulse leaving the delay elements 46, 46' is fed to the grid of one of the tubes which charges the corresponding field electrode 39 to the extent to which this electrode was charged before the charges were equalized by way of the tubes 41 and 42, so that the field electrode 39 is once again electrically neutral.

The arrangement must be such that the positive or negative charge can be applied to either of the electrodes 39. This must be so inasmuch as it is the direction of the field which will determine which of the two field electrodes will, after the short-circuiting and opening of the short-circuit, be negatively charged and which electrode will be positively charged. To this end a circuit is provided to which the grids of the tubes are connected. The impulse leaving the delay element 46 is either positive or negative, depending upon the direction of the field. If the pulse is positive, it passes through the rectifier 47 and the resistance 48 to the middle electrode 13, in which case the grids of the tubes 49 receive a positive potential so as to render the tubes conductive, and this, in turn, causes a negative charge to be supplied to the field electrodes 39. If the impulse leaving the delay element 46 is negative, it passes through the rectifier 47' and the resistance 48' to the middle electrode 13. An inverter 50 is provided which is capable of changing the sign of the impulse and this produces a positive potential on the grid of the tubes 49' so that these tubes are rendered conductive. In this way, a negative charge is drawn from the field electrodes 39 so as to render the same positively charged. A pulse leaving the delay element 46', which pulse has a sign opposite that of a pulse leaving the delay element 46, produces a similar result.

The charges supplied to the field electrodes 39 are taken from the plate batteries 51. Suitable switch means (not shown) may be provided for making sure that the charges supplied to the field electrodes 39 are proportional to the impulses taken from the measuring electrodes 2.

FIGURE 15 shows another embodiment according to the present invention which differs from the previously described embodiments, wherein upon each measurement the entire extraneous field is varied by an amount proportional to its strength so that the field intensity changes may be measured and given indication of the field strength, in that in the instant embodiment the extraneous field remains undisturbed and only that amount is measured by which the field intensity changes from place to place from time to time. These changes are relatively small and produce very small but constantly changing direct current components. Such current components are difficult to amplify, and in order to overcome this disadvantage suitable means are provided for modulating these direct current components, thereby avoiding the difficulties inherent in direct current amplification. Such modulation can take place either in the measuring circuit or in the input circuit of the amplifier. However, in the illustrated embodiment the extraneous field is modulated by a pulse field. The field electrodes 39 are connected to a pulse generator 52 which impresses sawtooth pulses upon the field electrodes 39 by way of capacitor 53. The modulation takes place in opposition, i.e., in one half of the measuring apparatus the modulation is in the direction of the field whereas in the other half it is in the opposite direction. In this way the modulation is eliminated in the measuring bridge.

In these embodiments in which a middle electrode 13 is arranged between the measuring electrodes 2, the voltage produced between the middle electrode and one of the measuring electrodes as well as the voltage produced between the middle electrode and the other measuring electrode can be amplified and fed to the bridge. In the other embodiments of the present invention it suffices if the voltage between the middle electrode and one of the measuring electrodes during changing of the extraneous field is measured and amplified. The switching circuit can then be so selected that depending upon the direction of the extraneous field only one or the other half of the apparatus is operative.

It will be understood that each of the elements described above, or two or more together, may also find a useful application in other types of measuring apparatus differing from the types described above.

While the invention has been illustrated and described as embodied in a measuring apparatus for measuring the field intensity of an extraneous field, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a measuring apparatus for measuring an electrostatic field, in combination, a pair of spaced capacitor plates; resistance means interconnecting said capacitor plates; a pair of spaced field plates arranged on opposite sides of and spaced from said capacitor plates; means for periodically short-circuiting and disconnecting said field plates to and from each other; amplifier means for amplifying a voltage caused by the flow of capacitance current through said resistance means at such times as said field plates are short-circuited; and charging means connected to the output of said amplifier means for charging said field plates, after the same have been disconnected from each other, to such an extent that they are electrically neutral relative to each other.

2. Apparatus as claimed in claim 1, wherein said means for periodically short-circuiting and disconnecting said field plates to and from each other include electronic switch means.

3. Apparatus as claimed in claim 2, wherein said switch means have an operating time constant such that the time interval during which said field plates are first short-circuited to each other and thereafter neutralized is large as compared to the period within which individual measurements are carried out.

4. Apparatus as claimed in claim 2, wherein said switch means include parallel but oppositely connected vacuum tubes.

5. Apparatus as claimed in claim 4, wherein each of said vacuum tubes includes a heating circuit; and, further comprising a pulse generator connected to each heating circuit for energizing the same and thereby rendering the corresponding vacuum tube conductive throughout the duration of each pulse.

6. Apparatus as claimed in claim 4, wherein said charging means include vacuum tube means having a grid connected to and controlled by the output of said amplifier means.

7. Apparatus as claimed in claim 6, wherein said vacuum tube means include at least a pair of vacuum tubes, and further comprising coupling means coupling the output of said amplifier means of one polarity to the grid of one of said vacuum tubes and coupling the output of said amplifier means of the opposite polarity to the grid of the other of said vacuum tubes.

8. Apparatus as claimed in claim 7, wherein said coupling means includes at least two rectifiers.

9. Apparatus as claimed in claim 7, further comprising time-delay means interposed between the output of said amplifier means and said charging means.

10. Apparatus as claimed in claim 9, wherein said time-delay means provides a delay time interval corresponding to the duration of the heating pulse.

References Cited by the Examiner

UNITED STATES PATENTS

| | | | |
|---|---|---|---|
| 1,720,662 | 7/1929 | Burke | 328—80 X |
| 2,189,352 | 2/1940 | Siegenheim | 324—32 |
| 2,381,990 | 8/1945 | Stevens | 317—249 |
| 2,432,089 | 12/1947 | Carter et al. | 317—249 |
| 2,449,068 | 9/1948 | Gunn | 324—72 |
| 2,579,277 | 12/1951 | Stanton | 320—1 |
| 2,587,156 | 2/1952 | Havenhill et al. | 324—72 |
| 2,637,010 | 4/1953 | Charske | 320—1 |
| 2,663,842 | 12/1953 | Graham | 324—32 |
| 2,815,483 | 12/1957 | Kaufman | 324—32 |
| 2,820,947 | 1/1958 | Gunn | 324—72 |
| 2,836,735 | 5/1958 | Kreutzer | 320—1 X |
| 2,843,736 | 7/1958 | Huntley | 320—1 X |

IRVING L. SRAGOW, *Primary Examiner.*

WALTER L. CARLSON, *Examiner.*